United States Patent [19]

Werner et al.

[11] 4,118,986
[45] Oct. 10, 1978

[54] TEMPERATURE MEASURING DEVICE FOR ROTARY KILNS

[75] Inventors: Dietrich Werner, Messel; Konrad Schymura, Oberursel; Hans Georgi, Bad Homburg; Walter Pech, Wiesbaden; Wilhelm Lange, Frankfurt am Main, all of Germany

[73] Assignee: Metallgesellschaft Aktiengesellschaft, Frankfurt am Main, Germany

[21] Appl. No.: 804,836

[22] Filed: Jun. 8, 1977

[30] Foreign Application Priority Data

Jun. 16, 1976 [DE] Fed. Rep. of Germany ....... 2626938

[51] Int. Cl.² ..................... G01K 13/02; G01K 13/08
[52] U.S. Cl. ..................................................... 73/351
[58] Field of Search .................. 73/351, 343 R, 432 A

[56] References Cited

U.S. PATENT DOCUMENTS

| 2,971,041 | 2/1961 | France ............................ 73/343 R X |
| 3,273,874 | 9/1966 | Hucke ............................... 73/351 X |
| 3,511,093 | 5/1970 | Cook ..................................... 73/351 |
| 3,946,610 | 3/1976 | Sartorius ............................. 73/343 R |

Primary Examiner—Charles Gorenstein
Attorney, Agent, or Firm—Burgess, Dinklage & Sprung

[57] ABSTRACT

A temperature measurement device for rotary kilns comprises a stripping sleeve rigidly mounted in a bore or the shell of a rotary kiln and has one end portion extending into the rotary kiln. A ceramic ring is mounted at the one end portion of the sleeve and a protective tube is slidably mounted in the stripping sleeve and through the opening in the ceramic ring. A thermocouple is disposed in the protective tube at one end portion thereof that corresponds to the one end portion of the stripping sleeve. The protective tube is lifted to retract its one end portion until the end thereof is disposed in the ceramic ring thereby scraping off any crust thereon and the tube is then lowered to such an extent that the one end portion thereof protrudes from the ceramic ring so that temperature measurement can be effected.

5 Claims, 3 Drawing Figures

TEMPERATURE MEASURING DEVICE FOR ROTARY KILNS

BACKGROUND OF THE INVENTION

This invention relates to a temperature-measuring device for rotary kilns, comprising a stripping sleeve, which is rigidly mounted in a bore in the shell of the rotary kiln and protrudes to some extent into the rotary kiln, and a thermocouple, which is disposed in a protective tube, which is movably disposed in the stripping sleeve and secured to a lifting and lowering device, which is mounted on the outside of the shell.

In processes carried out in a rotary kiln, e.g., in the direct reduction of iron oxides below the melting and softening point of the charge by means of solid and gaseous reducing agents, the temperature must be exactly controlled throughout the length of the rotary kiln. The temperature is usually measured by means of thermocouples, which are disposed in protective tubes, which are spaced along the rotary kiln and extend through the wall and revolve with the kiln. Because the charge tends to cake on the protective tubes or to soil the same in the kiln, the resulting deposits must be removed from time to time because an error would otherwise be introduced into the result of the measurement.

A known temperature-measuring device for rotary kilns disclosed in German application P 21 32 687 comprises a thermocouple disposed in a protective tube, which is surrounded by a sleeve, except for its lowermost portion. The protective tube and the sleeve are secured outside the shell of the rotary kiln to a holder, which bears on a spring element, which is secured laterally of the protective tube. A roller is disposed above the spring element and during a rotation of the rotary kiln enters a cam track, which causes the roller to force the protective tube and sleeve into the interior of the furnace. As the roller leaves the cam track, the spring element returns the protective tube and the sleeve. The parts are depressed when they reach that range of the rotary kiln which contains the charge and are returned as they leave that charge-containing range. Whereas crusts can be knocked off the kiln wall by this device as it is forced into the kiln, it is not possible to remove crusts or dirt from the protective tube. Besides the fact that the protective tube and the sleeve are laterally secured and guided may easily result in canting.

For measuring temperature in the kiln atmosphere of kilns for making cement it is known from German application P 12 66 538 to arrange the thermocouple and the protective tube in a stripping sleeve, which is disposed in a guide sleeve. Outside the kiln, the stripping sleeve is secured to a bellcrank lever and the latter is secured to a crank drive. When it is desired to remove dust from the protective tube, the stripping sleeve is pushed into the kiln beyond the end of the protective tube and is then pulled out. As the stripping sleeve is pulled out, dust is removed also from the stripping sleeve as a result of its cooperation with the guide sleeve. The crank drive may be replaced by an eccentric mechanism or similar drive means, which directly strikes against a projection of the stripping sleeve, which is resiliently mounted. Whereas this arrangement can be used to remove dust which has been deposited from the kiln atmosphere, difficulties are involved in the use of the arrangement with rotary kilns. As the device moves through the charge, crusts are formed on the protective tube and when the stripping sleeve is pushed inwardly these crusts can easily be seized between the stripping sleeve and protective tube and may then cause destruction. Particularly the edge of the stripping sleeve tends to be damaged quickly and to burn off and there is also a danger of canting.

From "Neues aus der Technik", Vogel-Verlag, Wurzburg, No. 3, June 1, 1973, page 1, it is known to provide a thermocouple in a protective tube, to arrange the latter in a fixed sleeve, to secure the protective tube outside the rotary kiln to a toggle joint, which is loaded by a compression spring, and to control the toggle joint by a cam disc during the rotation of the rotary kiln. In this arrangement, the protective tube is pulled into the sleeve and cleaned and as it leaves the cam disc is pushed out on the sleeve by the spring pressure. In that case too, crusts formed on the protective tube can easily be seized between the sleeve and the protective tube as the latter is pulled into the sleeve so that damage results and specifically the edge of the sleeve is damaged and burns off. There is also a danger of canting in this arrangement.

SUMMARY OF THE INVENTION

It is an object of the present invention to avoid the disadvantages of the known temperature-measuring devices and particularly to provide for rotary kilns a temperature-measuring device which enables coarse crusts to be knocked off and small impurities to be removed. It is another object of the invention that the device has a long life and is quickly replaceable.

Those and other objects are accomplished according to the invention wherein a ceramic ring is disposed in the stripping sleeve at its lower end, the lower end of the protective tube is mounted in the opening of the ceramic ring, the upper end of the protective tube is secured to a rod, which is coaxially guided in the lifting and lowering device with respect to the opening of the ceramic ring, the rod is first lowered toward the shell by the lifting and lowering device when it is desired to clean the protective tube and is then lifted so that the protective tube is retracted until its lower end is disposed in the ceramic ring, and the rod is lowered for a measurement of temperature to such an extent that part of the protective tube protrudes from the ceramic ring. The ceramic ring serves to guide the protective tube in the stripping sleeve and also as a stripper during the upward movement of the protective tube. Coarse crusts are knocked off as the protective tube is lowered at the beginning of the cleaning operation, and crusts and dirt which have been desposited directly on the ceramic ring and the protective tube are knocked off at the same time so that they cannot cause destruction or seizing during the subsequent lifting movement. Small crusts and impurities still adhering to the protective sleeve will be stripped off during the lifting movement. The cleaned protective tube is then extended to its position for measurement. The protective tube is cleaned when it is disposed in the free kiln atmosphere rather than in the charge. To facilitate a replacement of the ceramic ring, the stripping sleeve is arranged so that it can easily be pulled out of the kiln. Because the rod is coaxially guided as it is moved toward the opening of the ceramic ring, any canting of the protective tube during the cleaning operation is avoided. The protective tube can be pushed into the kiln when it has been separated from the rod.

In a preferred embodiment, the rod is vertically guided between two rollers with this arrangement an exact vertical guidance of the protective tube is ensured in a simple manner.

According to another preferred feature, a holder consisting of a clamp is secured to the lower end of the rod and serves to secure the upper end of the protective tube. With this arrangement, the protective tube can be secured to the rod and can quickly be released therefrom. This frictional clamp fastener has also the advantage that the protective tube will separate from its fixing means during the upward movement when the exposed portion of the protective tube in the kiln has become bent. As a result, damage to other parts will be avoided.

According to still another preferred feature, the lifting and lowering device comprises and eccentric mechanism, which is driven by a gearmotor, and the initial and final positions of the eccentric sheave are adjustable by a camwheel and by a brake, which is incorporated in the gearmotor. The eccentric mechanism engages the rod vertically over the same and enables in a simple manner a movement without canting.

According to a further preferred feature, the lifting and lowering device is pivoted on a lateral axis of rotation on a frame with this arrangement and the lifting and lowering device can quickly be tilted aside to render the other parts freely accessible.

BRIEF DESCRIPTION OF THE DRAWINGS

The invention will be explained more fully and by way of example with reference to the drawings.

DETAILED DESCRIPTION OF THE INVENTION

Figure 1:
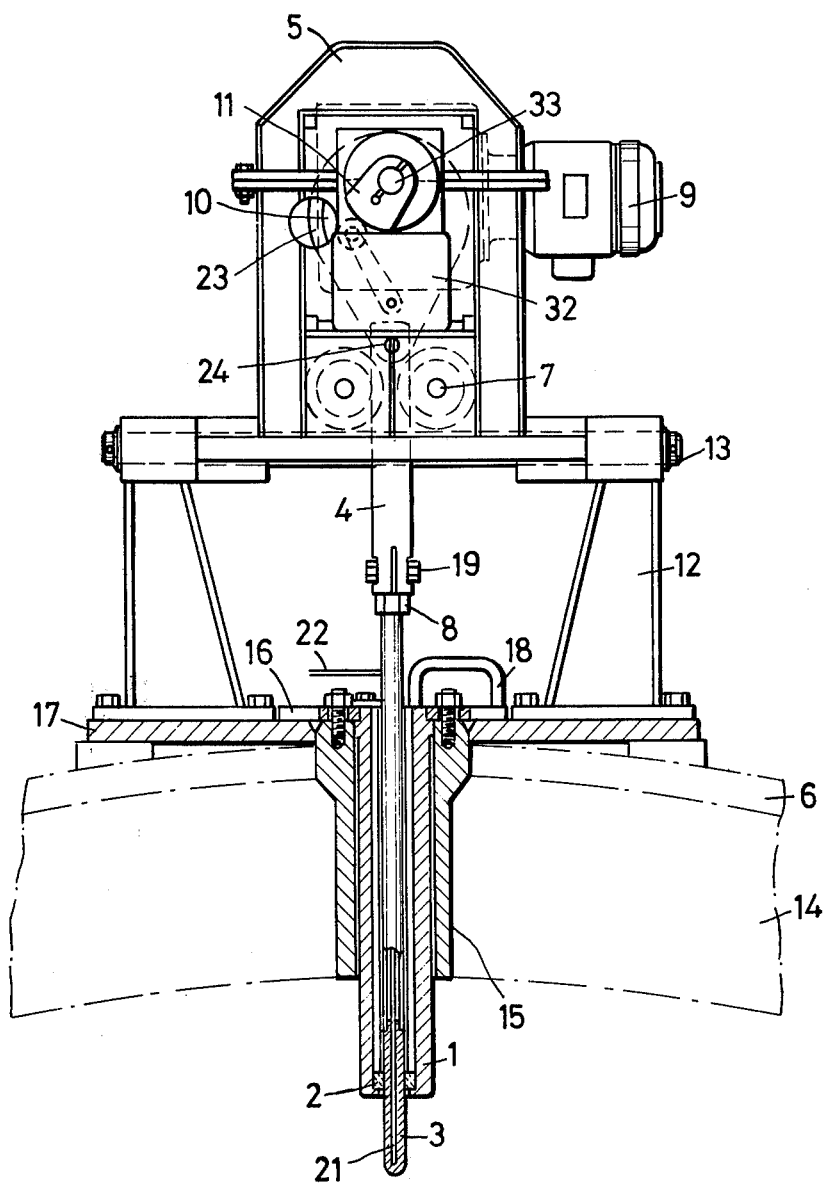
FIG. 1 is a transverse sectional view showing a rotary kiln with only part of the kiln wall shown and provided with a temperature-measuring device. Only part of the kiln wall is shown.
Figure 2:
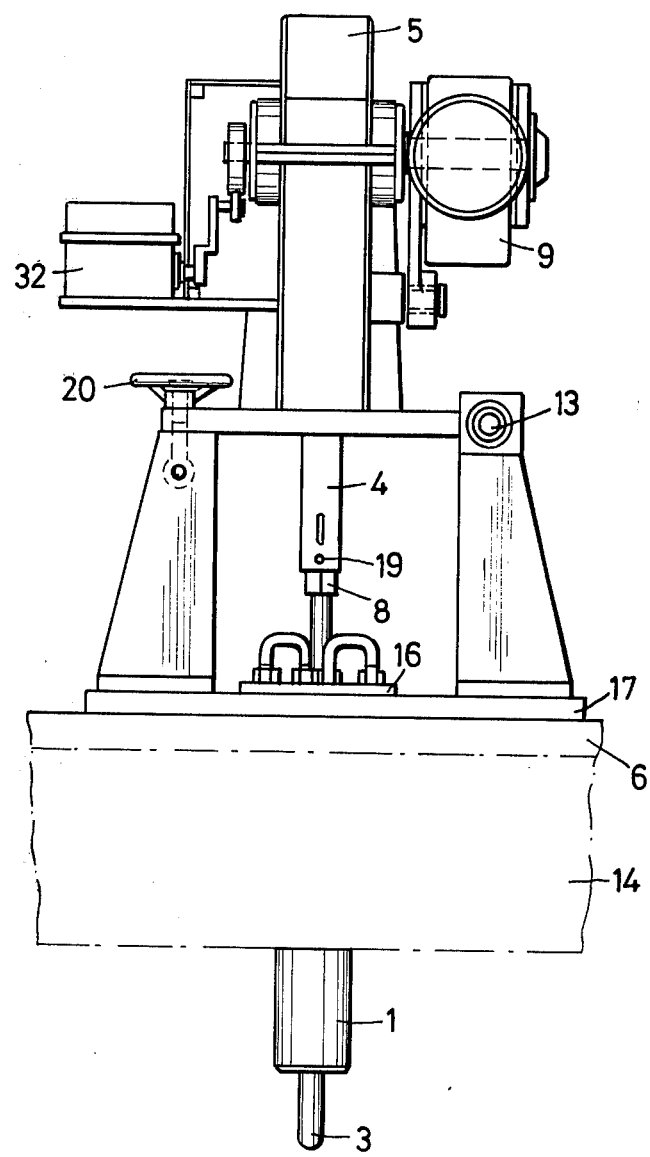
FIG. 2 is a side elevation showing the arrangement of FIG. 1.

A bore extending through a kiln shell 6 and a kiln lining 14 is provided with a sleeve 15 for the protection of the kiln lining 14. A stripping sleeve 1 is pushed into the protective sleeve 15 and carries a plate 16, which engages a bracket 17 and is fixed by screws. The plate 16 is provided with handles 18 to facilitate removal and insertion. A ceramic ring 2 is disposed in the stripping sleeve 1 at its lower end. The lower portion of a protective tube 3 has been inserted through the opening of the ceramic ring. The upper end of the protective tube 3 is secured in a holder 8, which consists of a clamp comprising a screw 19, which can be tightened to clamp the upper end of the protective tube 3 in position. The holder 8 is secured to a rod 4, which is coaxially guided in a lifting and lowering device 5 between two rollers 7 with respect to the opening of the ceramic ring 2. The lifting and lowering device 5 is carried by a frame 12, which is fixed with screws to the bracket 17. The lifting and lowering device 5 may be swung toward the side about a lateral pivot 13 when a quickly tightenable screw 20 has been released. A thermocouple 21 is disposed in the protective tube 3 and connected to leads 22, which extend out of the upper portion of the protective tube 3. The eccentric mechanism in the lifting and lowering device 5 is operated by a gearmotor 9. The initial and final positions of an eccentric sheave 10 are adjusted by a camwheel 11. In this way, the desired lowering movement, lifting movement, and measuring position of the protective tube are adjusted. The arrangement is held in position for measurement by a brake, which is incorporated in the gearmotor 9. When the gearmotor 9 is started, an eccentrically mounted connecting rod 23 moves the rod 4, to which it is connected by a pivot 24.

Figure 3:
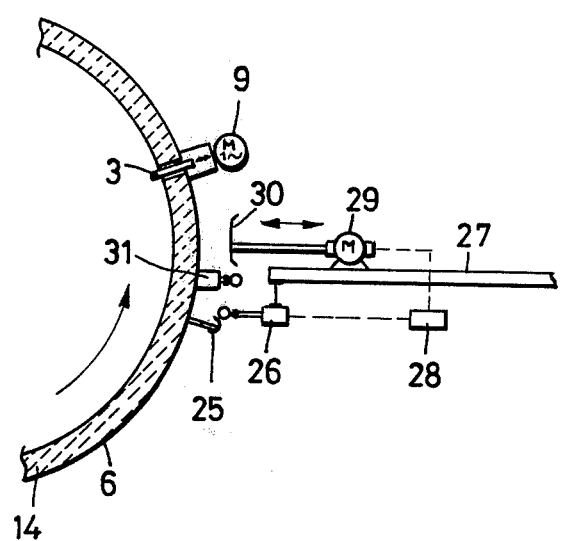
FIG. 3 shows means for actuating the temperature-measuring device.

In accordance with FIG. 3, a cam 25 secured to the kiln shell 6 is arranged to actuate a limit switch 26 once during each revolution of the kiln. The limit switch 26 is secured to a walkway 27. In response to each actuation, the limit switch 26 delivers a pulse to a presettable counter 28. When the preset number of pulses has been counted, an auxiliary motor 29 moves a coulisse 30 toward the rotary kiln to such a position that a limit switch 31 mounted on the rotary kiln is actuated and the gearmotor 9 is started. The coulisse 30 is so long that the limit switch 31 remains actuated until a limit switch 32 has been disengaged by the camwheel 11, which is mounted on a camshaft 33, and the circuit has thus been closed. The protective tube is now moved through a full cleaning cycle, until the camwheel 11 actuates the limit switch 32 once more to interrupt the circuit.

In the foregoing specification and in the claims, various statements of position and direction, such as "upper" and "lower", "upwardly" and "downwardly", "lifting" and "lowering", are applicable to the temperature-measuring device when it is at the top of the rotary kiln.

The advantages of the invention reside mainly in that the protective tube can be virtually completely cleaned from coarse crusts and small impurities and damage is substantially prevented as well as a canting of the protective tube during the cleaning operation and a rapid replacement is enabled.

It will be appreciated that the instand specification and claims are set for the by way of illustration and not limitation, and that various modifications and changes may be made without departing from the spirit and scope of the present invention.

What is claimed is:

1. A temperature measuring device for rotary kilns, comprising: a sleeve rigidly mounted in a bore in the shell of the rotary kiln and having one end portion extending into the rotary kiln, a ceramic ring mounted at said one end portion and having an inner opening having a diameter smaller than that of the sleeve, a protective tube received in the sleeve and closely received through the opening in the ceramic ring for sliding movement, wherein the tube is guided to avoid contact with the sleeve, a thermocouple disposed in the protective tube at one end portion thereof corresponding to said one end portion of the sleeve, means mounted on the outside of the shell and disposed directly above the opening in the ceramic ring and the sleeve for lifting and lowering the protective tube to effect the cleaning thereof comprising a rod secured to the other end portion of the protective tube, means coaxially guiding the tube in the lifting and lowering means with respect to the opening of the ceramic ring, and means controlling the lowering and lifting means to first lower the rod so that the protective tube can knock off dirt on the ceramic ring, to then lift the rod so that the one end portion of the protective tube is retracted until the end thereof is disposed in the ceramic ring and lastly lower the rod to such an extent that the one end portion of the protective tube protrudes from the ceramic ring to effect measurement.

2. A temperature measuring device according to claim 1, wherein the guiding means comprises two rollers between which the rod is vertically guided.

3. A temperature measuring device according to claim 1, further comprising a clamp secured to one end of the rod for securing the other end of the protective tube to the rod.

4. A temperature measuring device according to claim 1, wherein the lifting and lowering means comprises an eccentric mechanism, a gearmotor driving the eccentric mechanism a camwheel and a brake incorporated in the gearmotor for adjustably setting the initial and final positions of the eccentric sleeve.

5. A temperature measuring device according to claim 1, wherein the lifting and lowering means comprises a frame and means mounting same for pivotal movement on a lateral axis of rotation on the frame.

* * * * *